United States Patent [19]
Stephenson

[11] Patent Number: 5,347,597
[45] Date of Patent: Sep. 13, 1994

[54] IMAGE SCALING FOR THERMAL PRINTERS AND THE LIKE

[75] Inventor: Stanley W. Stephenson, Spencerport, N.Y.

[73] Assignee: Eastman Kodak Company, Rochester, N.Y.

[21] Appl. No.: 840,661

[22] Filed: Feb. 20, 1992

Related U.S. Application Data

[63] Continuation of Ser. No. 612,654, Nov. 14, 1990, abandoned.

[51] Int. Cl.$^5$ .............................................. G06K 9/42
[52] U.S. Cl. ......................................... 382/47; 382/42; 358/451
[58] Field of Search .................. 382/42, 47, 41, 44; 358/451, 428, 431; 346/1.1; G06K 9/64, 9/42; G06F 15/336; G01D 9/00

[56] References Cited

U.S. PATENT DOCUMENTS

| | | | |
|---|---|---|---|
| 4,569,081 | 2/1986 | Mintzer et al. | 382/47 |
| 4,622,560 | 11/1986 | Withoos et al. | 346/1.1 |
| 4,631,751 | 12/1986 | Anderson et al. | 382/47 |
| 4,651,287 | 3/1987 | Tsao et al. | 364/519 |
| 4,680,720 | 7/1987 | Yoshii et al. | 364/521 |
| 4,686,580 | 8/1987 | Kato et al. | 358/451 |
| 4,789,870 | 12/1988 | Lacord et al. | 346/1.1 |
| 4,827,281 | 5/1989 | Lubinsky et al. | 346/1.1 |
| 4,851,922 | 7/1989 | Takayama et al. | 358/451 |
| 5,016,193 | 5/1991 | Stone et al. | 358/451 |

Primary Examiner—Yon J. Couso
Attorney, Agent, or Firm—Raymond L. Owens

[57] ABSTRACT

A thermal printing system is disclosed in which a graphic image composed of a succession of lines having the same number of pixels each is scaled both horizontally and vertically by a factor of approximately 1.5 without altering the size of the pixels. The system disclosed replaces each 2 by 2 set of pixels with a 3 by 3 set of pixels. Each 2 by 2 set consists of two immediately adjacent pixels from the same line and the two immediately adjacent pixels from the next succeeding line. The corner pixels of the 3 by 3 set are identical to the four corner pixels of the 2 by 2 set. The intermediate pixels of the first and third lines have densities equal to the average of the densities of the two corner pixels on the same lines of the same set. The three pixels of the second line of the 3 by 3 set have densities equal to the respective averages of the densities of the pixels immediately adjacent to them in the first and third lines. In this manner, a standard 1024 pixel by 1280 pixel graphic image is transformed into a 1536 by 1920 pixel graphic image. When printed by a thermal printer using a FAX head with 8 dot per millimeter resolution, the resulting image loses substantially nothing of importance in the way of definition and is substantially equal in size to one printed with a standard head with 6 dot per millimeter resolution.

6 Claims, 5 Drawing Sheets

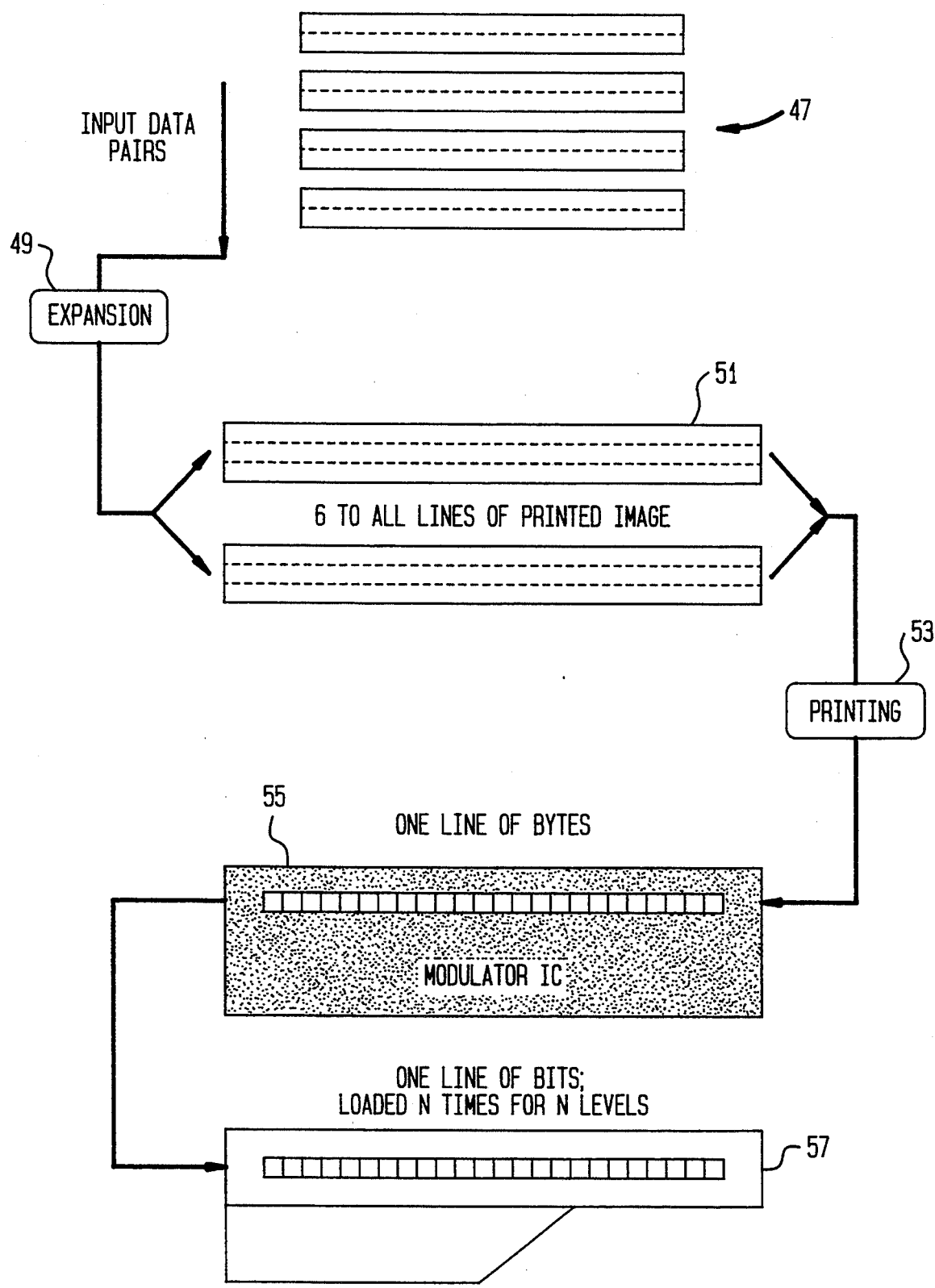

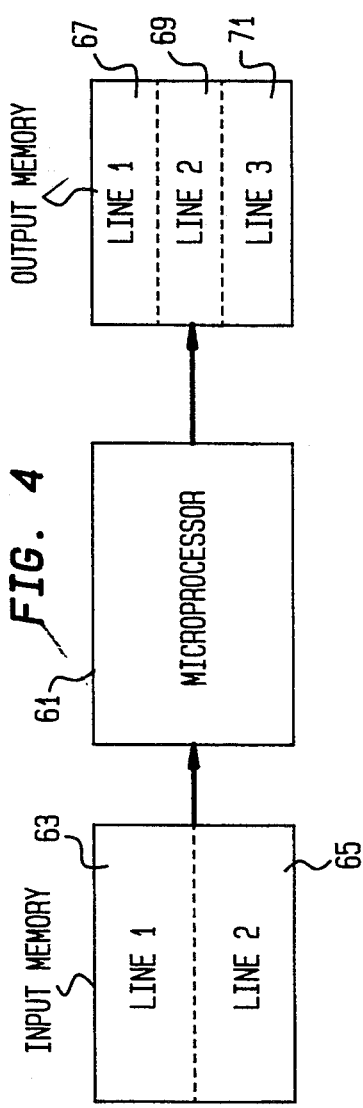
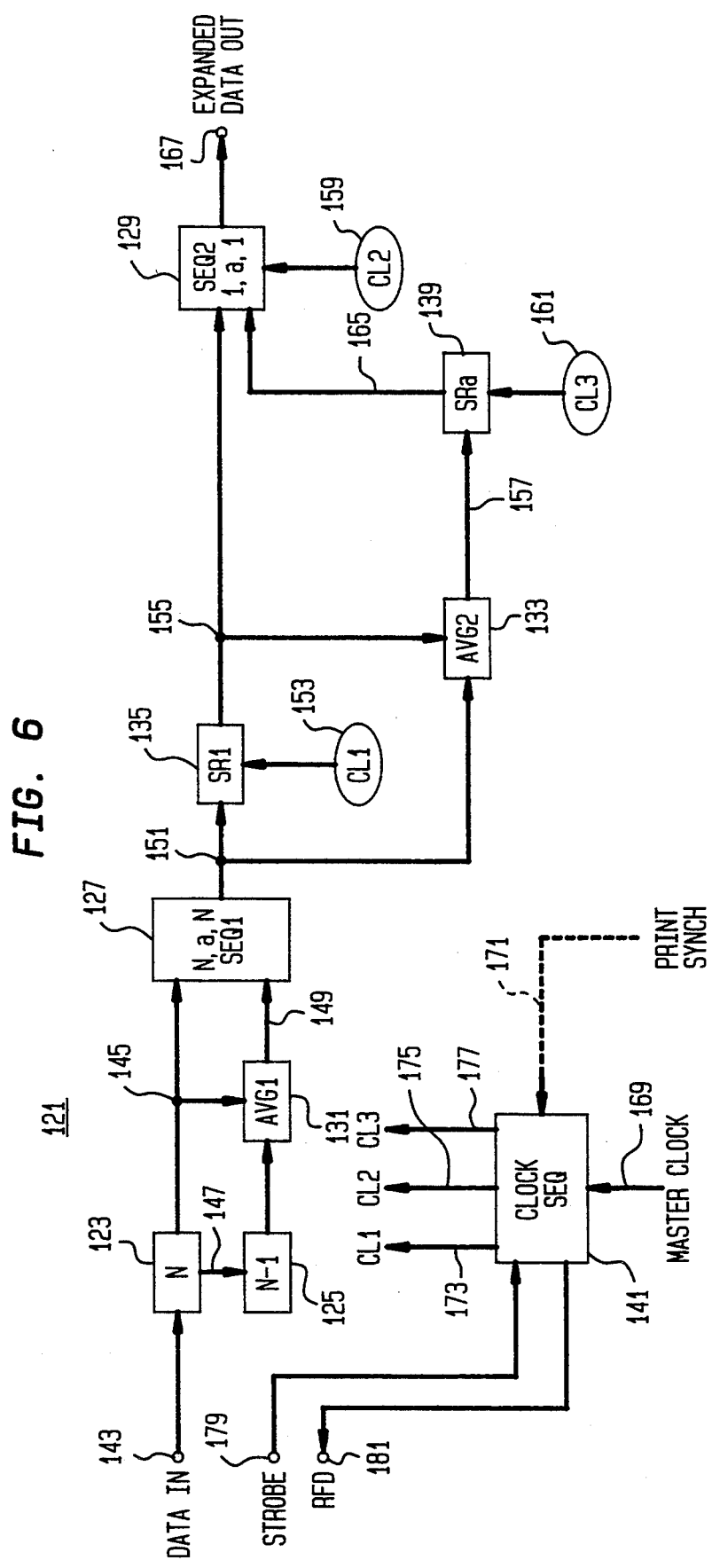

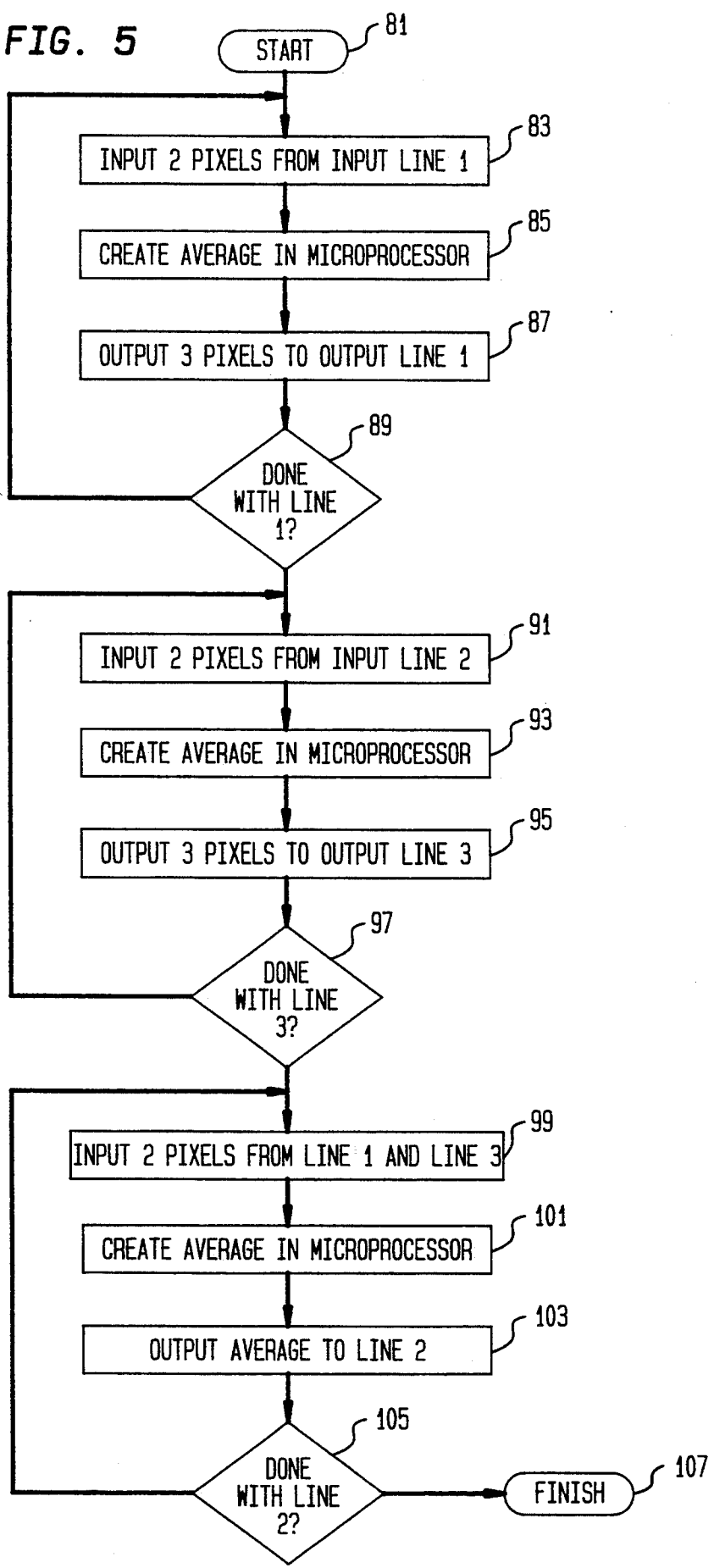

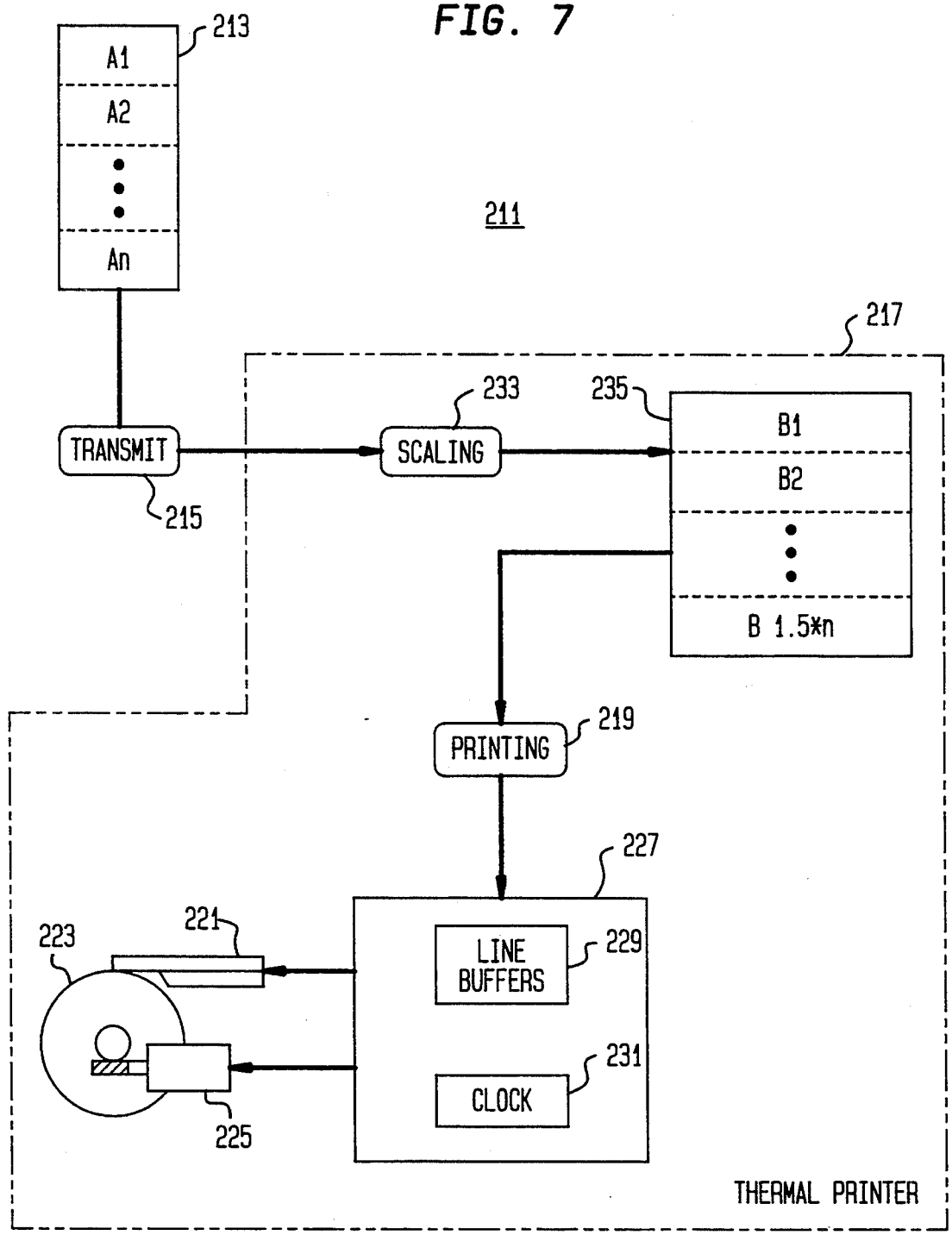

IMAGE SCALING FOR THERMAL PRINTERS AND THE LIKE

This is a continuation of application Ser. No. 612,654, filed Nov. 14, 1990 now abandoned.

FIELD OF THE INVENTION

This invention relates generally to printers which reproduce graphic images in the form of pixels of substantially constant size but of differing density and more particularly to methods for enlarging the images produced by such printers.

BACKGROUND OF THE INVENTION

Currently, the highest resolution video monitors have an image format consisting of 1024 lines at a resolution of 1280 pixels (picture elements) per line. When graphic images are printed on thermal printers in this format the printer head typically has 1280 pixels at a pitch of approximately 6 dots per millimeter. If the density of each pixel is controlled with sufficient accuracy, a nearly continuous tone image is produced. Alternatively, such images can be printed using facsimile (commonly referred to simply as FAX) printer heads, which operate in the same manner but typically print 1728 pixels per line at a pitch of 8 dots per millimeter. Because FAX heads are made in significantly larger volume than are 6 dot per millimeter thermal printer heads, they tend to be less expensive. When a 1280 by 1024 pixel image is printed on a thermal printer using a FAX head, however, the image is smaller than it would be if it had been printed with a 6 dot per millimeter head because each pixel remains constant in size. It would be commercially advantageous, therefore, if a graphic image could be scaled so that, when printed in a thermal printer using a FAX head, it would be comparable in size to similar images produced by standard 6 dot per millimeter heads.

SUMMARY OF THE INVENTION

The present invention is applicable to thermal printers and to any other printers which create images in the form of pixels of uniform size but of variable individual density. It permits a graphic image composed of a succession of lines having the same number of pixels each to be scaled both horizontally and vertically by a factor of substantially 1.5 without altering the size of the pixels. In general, the invention replaces each 2 by 2 set of pixels with a 3 by 3 set of pixels. Each 2 by 2 set consists of two immediately adjacent pixels from the same line and the two immediately adjacent pixels from the next succeeding line. The corner pixels of the 3 by 3 set are identical to the four corner pixels of the 2 by 2 set. The intermediate pixels of the first and third lines of the 3 by 3 set have densities, however, equal to the average of the densities of the two corner pixels on the same lines of the same set. The three pixels of the second line of the 3 by 3 set have densities equal to the respective averages of the densities of the pixels immediately adjacent to them in the first and third lines. In this manner, the 1024 pixel by 1280 pixel graphic image is transformed into a 1536 by 1920 pixel graphic image. When printed by a thermal printer using a FAX head with 8 dot per millimeter resolution, the resulting image loses nothing of importance in the way of definition and is substantially equal in size to one printed with a standard head with 6 dot per millimeter resolution.

More specifically, the invention enlarges such images by selecting lines of the original image in successive pairs and storing them in computer memory. Each of the stored lines in successive pairs is then scaled horizontally by generating an additional pixel between each pair of successive pixels in the same line, with each added pixel having a density equal to the average of the densities of the immediately adjacent pixels in the same pair in the same line. A new line is generated in computer memory to provide vertical expansion and each pixel of that line has a density which is equal to the average of the densities of the corresponding pixels in the two horizontally scaled lines of the pair. Finally, the three resulting lines in memory are read out in sequence, the initial one of the horizontally scaled lines first, the new line second, and the final one of the horizontally scaled lines third. When each pair of successive lines of the original image have been treated in this manner, an image scaled by a factor of substantially 1.5 results. As mentioned above, the final image loses nothing of significance in the way of definition.

The invention may be more fully understood from the following detailed description of several specific embodiments, taken in the light of the accompanying drawing and the appended claims.

BRIEF DESCRIPTION OF THE DRAWING

FIG. 3 illustrates typical flow of information, in embodiments of the invention, from input image to printer;

FIG. 4 is a block diagram showing a typical microprocessor accessing pairs of pixels at respective memory locations and delivering a group of three pixels at respective memory locations;

FIG. 5 is a flow chart illustrating details of how scaling is accomplished in accordance with the invention with the aid of a microprocessor like that shown in FIG. 4;

FIG. 6 is a block diagram of a hard wired circuit which may be used to accomplish the same scaling as the microprocessor illustrated in FIG. 4; and FIG. 7 is a block diagram illustrating how image expansion may be accomplished within a thermal printer with internal buffer memory.

DETAILED DESCRIPTION

Figure 1:
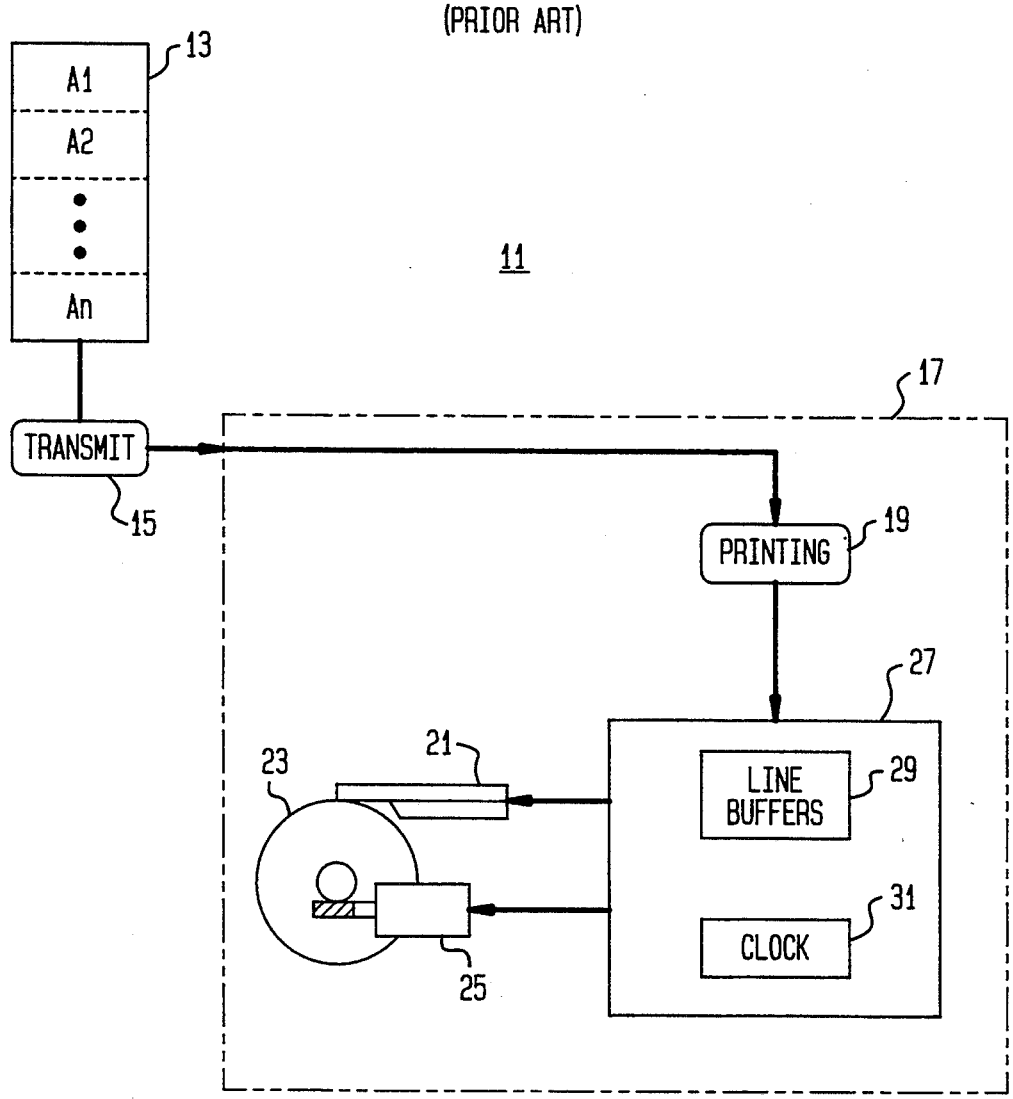
FIG. 1 is an overall block diagram of a thermal printing system of the type to which the invention may be applied.

The block diagram in FIG. 1 illustrates a prior art thermal printing system 11 and contains a source 13 of digital image data, a transmit control 15, and a thermal printer 17. Printer 17, in turn, includes a printing control 19, a thermal print head 21, a rotatable platen 23, a drive motor 25 for platen 23, and electronic control circuitry in the form of a modulator 27. Modulator 27 is typically a semiconductor integrated circuit and includes one or more line buffers 29 and a clock circuit 31. All of these components are well known in the art.

In FIG. 1, thermal print head 21 is typically made up of a plurality of resistive elements (not shown). These resistive elements are selectively energized by an array of drivers (not shown) controlled by an array of one bit latches (not shown), all within thermal head 21. Each latch is loaded by line buffers, which are in turn loaded with a sequence of binary values consisting of ones and zeros. The resulting line of bits is then captured by the latch array. When the latch array is enabled, the switches assume driving or non-driving conditions based upon the information that each latch receives from the shift register.

In operation of a prior art thermal printing system of the type shown in FIG. 1, energization of the individual pixels is controlled by sequentially shifting bit lines of data into the print head, thereby changing the cumulative energy delivered to individual pixels after a series of data loads into thermal head 21. Since the heat energy released in the resistive element is variable, a variable quantity of dye from a dye bearing web (not shown) can be transferred to a dye receiving member composed of a composite of plastic and/or paper layers. When the energization of the pixels is controlled with accuracy, a near continuous tone image results. Drive motor 25 advances the dye receiver under thermal head 21. The advance of the receiver is typically accomplished by means of rotatable platen 23.

In many thermal printers of the type shown in FIG. 1, modulator 27 receives a single line of printed information in byte format. Modulator 27 contains internal clock 31 which controls the motion of drive motor 25. Motor 25 receives a series of pulses for each line of data to generate platen motion sufficient to create dimensionally correct pixel data. At the same time, modulator 27 decodes the bytes of data into a series of bit lines which are sequentially loaded into printer head 21, controlling the on time for each bit-line of data. At the present time, such modulators typically generate up to 256 different levels (represented by bytes of 8 bits of data each) of color density for every line.

Line buffers 29 in FIG. 1 typically include two separate buffers, one which is active and one which is being loaded. In many printers a line of data, which can contain between 256 and 2048 or more bytes of data, is printed in from 10 to 30 milliseconds. For continuous printing, the data-receiving buffer in modulator 27 is supplied within this amount of time in order not to delay the printing. It is generally desirable that the printing be done continuously to prevent printing irregularities due to non-uniform platen motion.

Figure 2:
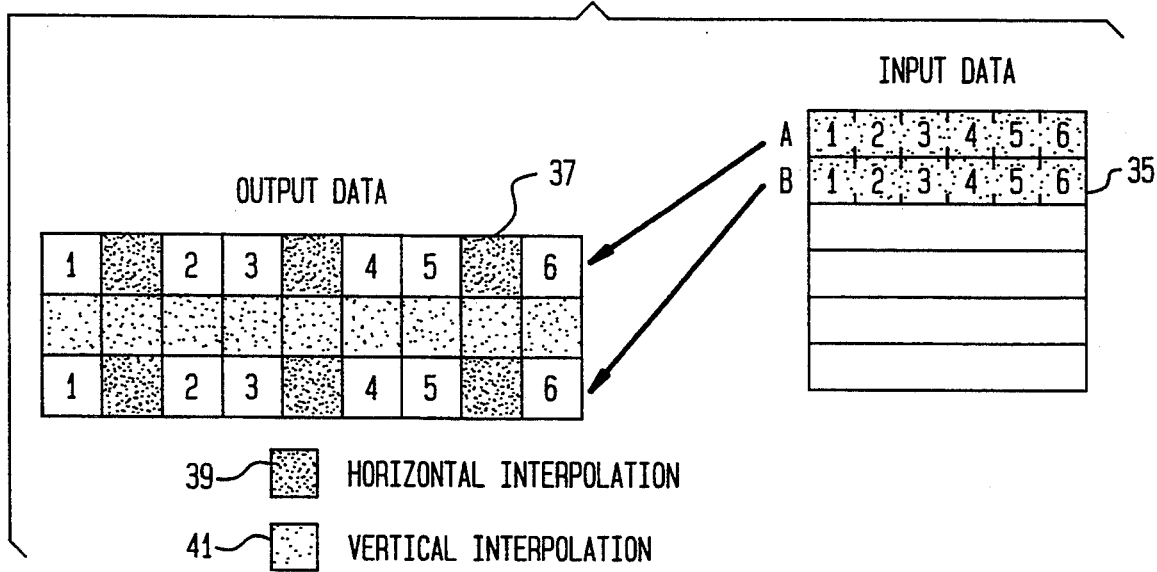
FIG. 2 is a graphical illustration of the manner in which scaling accomplished in accordance with the invention.

FIG. 2 illustrates the manner in which the present invention scales both horizontally and vertically a graphic image supplied to a thermal printer system like that shown in FIG. 1. In FIG. 2, block 35 shows a sequence of lines of pixels, beginning with lines A and B. These lines are processed in pairs. In FIG. 2, the pixels of each line are shown numbered in sequence. In the interest of clarity, only 6 pixels are shown in each line although in practice there would be a great many more. From one point of view, each 2 by 2 set of pixels from lines A and B is replaced by a 3 by 3 set in block 37, providing both horizontal and vertical expansion. The corner pixels in each 3 by 3 block are the same and have the same densities as the corner pixels in the original 2 by 2 block. Between pixels 1 and 2 in each outer line of the 3 by 3 block, though, a new pixel has been generated and introduced which has a density equal to the average of the densities of pixels 1 and 2. A similar insertion takes place between pixels 3 and 4 and between pixels 5 and 6. The center line of pixels in block 37 is newly generated and is made up of individual pixels each having a density equal to the average of the densities of its immediate neighbors in the outer lines. Thus the pixel between pixels 1 and 1 has a density equal to their average density, the pixel between the next newly generated outer (in the vertical sense) pixels has a density equal to their average density, the pixel between pixels 2 and 2 has a density equal to their average density, and so on. Shadings 39 and 41 are used in FIG. 2 to show that the inserted pixels with the darker shadings result from horizontal interpolation, while those with the lighter shadings result from vertical interpolation.

From another point of view, in the process shown in FIG. 2, the first input line processed is stored in memory and used as the basis for generating a new line in which a new pixel has been inserted between the pixels comprising each successive pair of pixels in that line. Each newly interpolated pixel has a density equal to the average of those of its immediate neighbors in the original pair. The second input line processed is also stored in memory and the process repeats. Before read-out takes place, though, a third and entirely new line is generated and each of its pixels has a density equal to the average of its immediately adjacent neighbors in the other two lines. The first line stored is then read out of memory first, the newly generated line second, and the second line stored is read out last.

FIG. 3 illustrates typical flow of information in printer systems making use of the invention. There, lines of pixels from an original image are entered in sequential pairs 47. These pairs are then subjected to a horizontal and vertical expansion process 49 in accordance with the invention, with each pair emerging as a set of three lines, as shown in the line sequence labeled 51. The expanded lines 51 are then read into the printer by process step 53 and supplied sequentially to the line buffer in a modulator 55. From the line buffer, they are supplied to the thermal print head 57, which prints a scaled image as the process continues with subsequent pairs of input lines. The logic involved in the illustrated scaling may be accomplished either with the aid of a general purpose microprocessor or by hard wired logic circuitry created for that purpose alone.

FIG. 4 is a simplified block diagram consisting of a microprocessor 61 suitable for use in enlarging images in accordance with the invention. In FIG. 4, microprocessor 61 is shown as accessing two pixels from memory locations 63 and 65 and outputting three pixels to memory locations 67, 69, and 71. In accordance with the invention, incoming lines of pixels are supplied to microprocessor 61 in successive pairs, with the first line (LINE 1) of each pair supplied from memory location 63 and the second (LINE 2) from memory location 65. The three resulting lines of pixels (LINES 1, 2, and 3) are read out of microprocessor 61 in sequence to memory locations 67, 69, and 71, providing both horizontal and vertical expansion.

FIG. 5 is a flow chart illustrating operation of microprocessor 61 in FIG. 4 during the image enlargement process. Start symbol 81 denotes the beginning of the process. A first pair of pixels from input LINE 1 is read into microprocessor 61 in step 83 from memory location 63. Microprocessor 61 creates a new pixel, the density of which is equal to the average of the densities of the pixels constituting the pair, in step 85. The three pixels read to LINE 1 memory location 67 in step 87 are, in sequence, the first pixel of the original pair, the new averaged pixel, and the second pixel of the original pair. At that point, inquiry is made in step 89 whether there are more pairs of pixels to be processed in LINE 1 of the original image. As shown, the process cycles through steps 83, 85, and 87 until the entirety of LINE 1 has been processed and appears as horizontally expanded LINE 1 in memory location 67.

When processing of the first line of the image is complete, the process moves on to step 91, where the first two pixels from input LINE 2 are read into microprocessor 61. Microprocessor 61 then, in step 93, creates a new pixel, the density of which is equal to the average of the density of the pixels of the incoming pair. In step 95, microprocessor 61 reads out to memory location 71, in sequence, the first pixel of the original pair, the new averaged pixel, and the second pixel of the original pair. Step 97 determines whether there are more pairs of pixels to be processed in input LINE 2 of the original image. As shown, the process cycles through steps 91, 93, and 95 until the entirety of LINE 2 has been processed and appears as horizontally expanded LINE 3 memory location 71.

The remainder of the process illustrated in FIG. 5 creates, as LINE 2 in memory location 69, a new line of pixels, each of which has a density equal to the average of the densities of the most nearly adjacent pixels of new LINE 1 and LINE 3. In step 99, microprocessor 61 receives the first pixels from each of horizontally expanded LINES 1 and 3. An average of those is created in step 101, with the newly created pixel being an average of the pixels of horizontally expanded LINES 1 and 3. Step 103 sends the newly created pixel as part of LINE 2 to memory location 69, while step 105 determines whether there are more groups of three pixels to be processed in horizontally expanded LINES 1 and 3. As shown, the process cycles through steps 99, 101, and 103 until the entirety of new LINES 1 and 3 has been processed and the new line of pixels appears as LINE 2 at memory location 69 to provide vertical expansion for the image.

Finally, in the FIG. 5 flow chart, step 107 is reached when LINES 1, 2, and 3 have been built. It is to be understood, of course, that the entire process then begins again at start 81 and continues until each pair of lines of pixels in the original image has been processed.

FIG. 6 is a block diagram of a hardware implementation which performs the image expansion provided by the invention and is an alternative to the microprocessor implementation illustrated in FIGS. 4 and 5. FIG. 6 shows an expander 121 which is composed of, as its principal components, two latch circuits 123 and 125, two sequence control circuits 127 and 129, two averaging circuits 131 and 133, two shift registers 135 and 139, and a clock sequence circuit 141. Incoming image data bytes representing sequential pixels, each in the form of a signal (n), from a first line of pixels enter at an input terminal 143 and are supplied to the input side of latch circuit 123. Latch circuit 123 has two outputs 145 and 147. Each byte entering from terminal 143 is shifted through output 147 to the input of latch circuit 125 under the command of a clock signal generated by clock sequence circuit 123 and is, at the same time, made available through output 145 to an input of sequence control circuit 127. When the next data byte enters latch circuit 123, the process is repeated. The respective bytes appearing at outputs 145 and 147 are supplied to respective inputs of averaging circuit 131. Averaging circuit 131, in turn, has an output 149. With every clock pulse, the outputs of latch circuits 123 and 125 are thus averaged and supplied to sequence control circuit 127 as a signal (a). Sequence control circuit 127 is simply a logic circuit controlling the order in which it supplies outgoing data bytes. It thus sequentially transfers to an output 151 the first of two bytes (n), then the averaged value (a), and finally the second of the two bytes (n) to perform a horizontal expansion.

In the next segment of FIG. 6, the horizontally expanded succession of bytes from output 151 is transferred to shift register 135, which stores the data bytes constituting one fully expanded print line. The operation of shift register 135 is timed by clock pulses supplied from an internal clock source 153. The output 155 of shift register 135 is supplied both to an input of sequence control circuit 129 and to an input of averaging circuit 133. The output 157 of shift register 133 is supplied to the input of shift register 139. The operation of shift register 139 is timed by clock pulses supplied from an internal clock source 161. The output 155 of shift register 135 and the output 165 of shift register 139 are both supplied to inputs of sequence control circuit 129.

Data bytes from output 155 of shift register 135 and from output 151 of sequence control circuit 127 are thus both supplied to averaging circuit 133. In this manner, as data bytes are fed into shift register 135, the same information is averaged with the bytes leaving shift register 135 by averaging circuit 133. The resulting data generated by averaging circuit 133 are equivalent to an average between the first and second lines of horizontally expanded data appearing at output 151 of sequence control circuit 127. The average of every two lines is stored in shift register 139.

The hardware implementation shown in FIG. 6 is completed by an output terminal 167 of sequence control circuit 129, an input to clock sequence circuit 141 from a master clock (not shown), an optional printer synchronizing signal input 171 to clock sequence circuit 141, three internal clock outputs 173, 175, and 177 from clock sequence circuit 141, a strobe input 179 to clock sequence circuit 141, and a ready for data output 181 from clock sequence circuit 141. Clock output 173 provides control signals for internal clock source 153, clock output 175 provides control signals for internal clock source 159, and clock output 177 provides control signals for internal clock source 161.

In operation, as shift registers 135 and 139 are being filled, lines of data are delivered through terminal 167 under the control of sequence control circuit 129, which produces output data lines in triplets from shift registers 135 and 139 while pairs or doublets of data lines are fed into expander 121. The data input line waits for an averaged line to be delivered between every two lines of data as the latter are fed into the expander at input terminal 143. The master clock operates more rapidly than the input data rate by a factor of at least 2.25.

Each of the shift registers and latches in expander 121 is controlled by the master clock through clock sequence circuit 141. The master clock signal is processed into a series of internal clock inputs 153, 159, and 161 by clock sequence circuit 141. These sub-clocks provide the asynchronous data shifting needed for the expansion process. In addition, expander 121 depends upon a continued flow of data from external components. This control is provided by terminals 179 and 181 of clock sequence circuit 141. Output terminal 181 indicates when expander 121 is ready for data and changes state to inform external circuitry (not shown) to load input terminal 143 with a new element of data. The external circuitry informs clock sequence circuit 141 when the data can be read in by changing the state of a strobe signal at input terminal 179. If the data are being fed out of expander 121 to the head of a thermal printer without intermediate storage, clock sequence circuit can be fitted with an additional input 171 that allows for synchronization of the data output to the thermal printing process.

The block diagram of FIG. 7 shows how image expansion in accordance with the invention may take place in a thermal printer with buffer memory. FIG. 7 generally follows the pattern of FIG. 1 and illustrates a thermal printing system 211 containing a source 213 of digital image data, a transmit control 215, and a thermal printer 217. Printer 217 includes a printing control 219, a thermal print head 221, a rotatable platen 223, a drive motor 225 for platen 223, and electronic control circuitry in the form of a modulator 227. Modulator 227 is typically a semiconductor integrated circuit and includes at least one line buffer 229 and a clock circuit 231.

Where the block diagram of FIG. 7 differs from that on FIG. 1 is that in FIG. 7 thermal printer 217 also includes scaling circuitry 233 and a memory buffer 235. Scaling circuitry 233 may take the form of either the microprocessor circuitry described in connection with FIGS. 4 and 5 or the dedicated hardware circuitry described in connection with FIG. 6. Alternatively, both scaling circuitry 233 and memory buffer 235 may be located outside of printer 217.

It is to be understood that the embodiments of the invention which have been described are illustrative. Numerous other arrangements and modifications may be readily devised by those skilled in the art without departing from the spirit and scope of the invention.

What is claimed is:

1. A method of enlarging an image composed of a plurality of successive lines of pixels comprising the steps of:
   selecting said lines in successive pairs and storing both lines of each pair in memory;
   scaling both of said stored lines horizontally by generating an additional averaged pixel between each pair of successive pixels in the same line, each of said additional pixels having a density equal to the average of densities of the immediately adjacent pixels in the same line;
   generating in memory a third line of all averaged pixels, each pixel of which is equal in density to the average of the densities of the corresponding pixels in each of said horizontally scaled lines; and
   reading out of memory in sequence to provide vertical scaling, the first of the horizontally scaled pair of lines, the third line generated in memory, and the second of the horizontally scaled pair of lines.

2. A method of enlarging an image composed of a plurality of successive lines of pixels which comprises processing said lines in successive pairs of odd and even numbered lines by the steps of:
   selecting the odd numbered line of each pair and storing it in memory;
   scaling the selected odd numbered line in memory horizontally by generating a first additional averaged pixel between each pair of successive pixels in the same line, each of said first additional pixels having a density equal to the average of the densities of the immediately adjacent pixels in the same line;
   selecting the even numbered line of each pair and storing it in memory;
   scaling the selected even numbered line in memory horizontally by generating a second additional averaged pixel between each pair of successive pixels in the same line, each of said second additional pixels having a density equal to the average of the densities of the immediately adjacent pixels in the same line;
   generating in memory for each pair a new line of all averaged pixels, each pixel of which has a density equal to the average of the densities of the corresponding pixels in the scaled odd and even numbered lines; and
   reading out of memory in sequence to provide vertical scaling, first the horizontally scaled odd numbered line, second said new line, and third the horizontally scaled even numbered line.

3. An arrangement for enlarging an image composed of a plurality of successive lines of pixels, said arrangement comprising:
   memory for temporary data storage;
   means for selecting said lines in successive pairs and storing both lines of each pair in said memory;
   means for scaling both of said stored lines horizontally by generating an additional averaged pixel between each pair of successive pixels in the same line, each of said additional pixels having a density equal to the average of densities of the immediately adjacent pixels in the same line;
   means for generating in said memory a third line of all averaged pixels, each pixel of which is equal in density to the average of the densities of the corresponding pixels in each of said scaled lines; and
   means for reading out of said memory in sequence to provide vertical scaling, the first of the horizontally scaled pair of lines, the third line generated in said memory, and the second of the horizontally scaled pair of lines.

4. An arrangement for enlarging an image composed of a plurality of successive lines of pixels in which said lines are processed in successive pairs of odd and even numbered lines, said arrangement comprising:
   memory for temporary data storage;
   means for selecting the odd numbered line of each pair and storing it in said memory;
   means for scaling the selected odd numbered line in said memory horizontally by generating a first additional averaged pixel between each pair of successive pixels in the same line, each of said first additional pixels having a density equal to the average of the densities of the immediately adjacent pixels in the same line;
   means for selecting the even numbered line of each pair and storing it in said memory;
   means for scaling the selected even numbered line in said memory horizontally by generating a second additional averaged pixel between each pair of successive pixels in the same line, each of said second additional pixels having a density equal to the average of the densities of the immediately adjacent pixels in the same line;
   means for generating in said memory for each pair a new line of all averaged pixels, each pixel of which has a density equal to the average of the densities of the corresponding pixels in the scaled odd and even numbered lines; and
   means for reading out of said memory in sequence to provide vertical scaling, first the scaled odd numbered line, second said new line, and third the scaled even numbered line.

5. The arrangement of claim 4 which consists substantially of a microprocessor.

6. The arrangement of claim 4 which consists substantially of dedicated logic circuitry.

* * * * *